US 6,658,160 B1

(12) United States Patent
Winter et al.

(10) Patent No.: US 6,658,160 B1
(45) Date of Patent: Dec. 2, 2003

(54) METHOD AND APPARATUS FOR THE RECORDING AND REPRODUCTION OF VIDEO AND/OR AUDIO SIGNALS

(75) Inventors: Marco Winter, Hannover (DE); Harald Schiller, Hannover (DE)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/316,849

(22) Filed: May 21, 1999

(30) Foreign Application Priority Data

May 25, 1998 (DE) .......................... 198 22 975

(51) Int. Cl.⁷ ............................. G06K 9/36; G06K 9/46; H04N 11/02; H04N 7/26
(52) U.S. Cl. ................... 382/245; 386/109; 386/33; 386/95; 386/96; 382/232; 382/233
(58) Field of Search .................. 386/95–98, 81, 386/46, 69, 83, 113–125; 382/245, 232, 233; 709/238–250

(56) References Cited

U.S. PATENT DOCUMENTS

| 4,786,982 A | * | 11/1988 | Wakahara et al. | ............ 386/81 |
| 5,905,845 A | * | 5/1999 | Okada et al. | ................. 386/98 |
| 6,088,507 A | * | 7/2000 | Yamauchi et al. | ............ 386/95 |
| 6,148,138 A | * | 11/2000 | Sawabe et al. | ................ 386/69 |
| 6,230,209 B1 | * | 5/2001 | Zenda | ........................ 709/247 |

FOREIGN PATENT DOCUMENTS

| EP | 737009 A2 | 10/1996 | ............ H04N/5/92 |
| EP | 790739 A2 | 8/1997 | ............ H04N/5/92 |
| EP | 0806868 | 11/1997 | |
| EP | 808072 A | 11/1997 | ............ H04N/9/82 |
| EP | 0838948 | 4/1998 | |
| EP | 840508 A1 | 5/1998 | ............ H04N/5/92 |
| JP | 09331499 | 12/1997 | ............ H04N/5/91 |

* cited by examiner

*Primary Examiner*—Andrew W. Johns
*Assistant Examiner*—Amir Alavi
(74) *Attorney, Agent, or Firm*—Joseph S. Tripoli; Paul P. Kiel

(57) ABSTRACT

A method for recording and reproducing video and/or audio signals having an additional information item, e.g. a title information item, recorded therein, which additional information item may be subsequently inserted into a video picture during reproduction. The additional information data are converted, thereby producing an executable sub-picture unit, and is recorded in a corresponding sub-picture data pack in addition to the data packs for the video/audio signal. Thus, it is possible to record the additional information data separately without difficulty without necessitating a change to the recording format to the effect that special data packs for the additional information items are included in the planning. The invention also relates to a corresponding recording and reproduction apparatus.

15 Claims, 25 Drawing Sheets

```
/*----------------------------------------------------------------
  Copyright (c) 1998, This software is the property of Thomson
  multimedia, and shall not be reproduced, copied, or distributed
  without written permission.
  ----------------------------------------------------------------*/
/*----------------------------------------------------------------
  AUTHOR       Marco Winter
  DATE CREATED 17-MAR-1998
  PROJECT:     DVD, realtime sub-picture pack generation
  DESCRIPTION:
      Realtime generating of sub-picture packs
  ----------------------------------------------------------------*/
/******************************* INCLUDES ********************************/
#include <string.h>
/******************************* DEFINES: ********************************/
#define N_ROWS 7                        /* pixel height of a character */
#define SPACE_BETWEEN_2_CHARACTERS 2    /* no. of pels between 2 characters */
/*************************** TYPE DEFINITIONS: ***************************/
typedef unsigned char  Uint8;
typedef unsigned short Uint16;
typedef unsigned long  Uint32;
typedef          char  Int8;
typedef          short Int16;
typedef          long  Int32;
/******************************* VARIABLES: ******************************/
/* control variables for bit manipulation:   */
static Uint8   tmpbuf = 0;
static Uint32  tmppos = 0;
static size_ت  tmplen = 0;

/* a pointer inside the compressed bitmap:   */
static Uint8   *bitmap;
/* struct for the run-length code of one row of a character: */
struct CharacterRow {
    Uint32 nNibbel,          /* length of the run-length code in nibbel */
           nBeginningPel,    /* leading background pel */
           nRemainingPel;    /* trailing background pel */
    Uint8  runLengthCode [2]; /* the run-length code itself */
};
```

FIG. 10A

```
/* run-length code of the characters:   */
  const struct CharacterRow characterSet[ ] [N_ROWS] = {
  {/*** 0 ***/
    {1, 1, 1, { 0x90,    0}},  /* .00. */
    {3, 0, 0, { 0x58, 0x50}},  /* 0. .0 */
    {3, 0, 0, { 0x58, 0x50}},  /* 0. .0 */
    {3, 0, 0, { 0x58, 0x50}},  /* 0. .0 */
    {3, 0, 0, { 0x58, 0x50}},  /* 0. .0 */
    {3, 0, 0, { 0x58, 0x50}},  /* 0. .0 */
    {1, 1, 1, { 0x90,    0 }}  /* .00. */
  }, {/*** 1 ***/
    {1, 2, 1, { 0x50,    0}},  /* ..1. */
    {1, 1, 1, { 0x90,    0   }}, /*  .11.  */
    {3, 0, 1, { 0x54, 0x50   }}, /*  1.1.  */
    {1, 2, 1, { 0x50,    0   }}, /*  .1.   */
    {1, 2, 1, { 0x50,    0   }}, /*  .1.   */
    {1, 2, 1, { 0x50,    0   }}, /*  .1.   */
    {1, 1, 0, { 0xD0,    0   }}  /*  .111  */
  }, {/*** 2 ***/
    {1, 1, 1, { 0x90,    0   }}, /*  .22.  */
    {3, 0, 0, { 0x58, 0x50   }}, /*  2..2  */
    {1, 3, 0, { 0x50,    0   }}, /*  ...2  */
    {1, 2, 1, { 0x50,    0   }}, /*  ..2.  */
    {1, 1, 2, { 0x50,    0   }}, /*  .2..  */
    {1, 0, 3, { 0x50,    0   }}, /*  2...  */
    {2, 0, 0, { 0x11,    0   }}  /*  2222  */
  }, {/*** 3 ***/
    {1, 1, 1, { 0x90,    0   }}, /*  .33.  */
    {3, 0, 0, { 0x58, 0x50   }}, /*  3..3  */
    {1, 3, 0, { 0x50,    0   }}, /*  ...3  */
    {1, 2, 1, { 0x50,    0   }}, /*  ..3.  */
    {1, 3, 0, { 0x50,    0   }}, /*  ...3  */
    {3, 0, 0, { 0x58, 0x50   }}, /*  3..3  */
    {1, 1, 1, { 0x90,    0   }}  /*  .33.  */
  }, {/*** 4 ***/
    {1, 0, 3, { 0x50,    0   }}, /*  4...  */
    {1, 0, 3, { 0x50,    0   }}, /*  4...  */
    {3, 0, 1, { 0x54, 0x50   }}, /*  4.4.. */
    {3, 0, 1, { 0x54, 0x50   }}, /*  4.4.  */
    {2, 0, 0, { 0x11,    0   }}, /*  4444  */
    {1, 2, 1, { 0x50,    0   }}, /*  ..4.  */
    {1, 2, 1, { 0x50,    0   }}  /*  ..4.  */
```

```
    }, {/*** : ***/
      {0, 4, 0, {    0,      0 }}, /* .... */
      {0, 4, 0, {    0,      0 }}, /* ... */
      {1, 1, 2, { 0x50,      0 }}, /* :. */
      {0, 4, 0, {    0,      0 }}, /* .... */
      {1, 1, 2, { 0x50,      0 }}, /* :. */
      {0, 4, 0, {    0,      0 }}, /* .... */
      {0, 4, 0, {    0,      0 }}  /* .... */
    }, {/*** SPACE ***/
      {0, 4, 0, {    0,      0 }},
      {0, 4, 0, {    0,      0 }},
      {0, 4, 0, {    0,      0 }},
      {0, 4, 0, {    0,      0 }},
      {0, 4, 0, {    0,      0 }},
      {0, 4, 0, {    0,      0 }},
      {0, 4, 0, {    0,      0 }}
    },
  };
/* generates byte alignment for the compressed bitmap of a SP line:   */
#define putAlign( )  if( !tmppos); else putHBit( (Uint32) 0, 8-tmppos)
/* puts the <n> most significant bits of the 32 bit value <b>
 * into buffer <bitmap>:  */
static void putBit(Uint32 b,  Int32 n) {
*/ significant bits in <b> are on the left side of Uint32 word */ while( --n>=0)  {
  tmppos++;
  tmpbuf <<= 1;
  if( b&(unsigned long)0x80000000) tmpbuf++;
  b <<= 1;
  if( tmppos == 8)  {
    *bitmap++ = tmpbuf;
    tmppos = 0;
    tmplen++;
  }
}
}/* putBit( ) */
/* puts the <n> most significant bits of the first 8 bits of
 * value <b> into buffer <bitmap>:  */
static void putHBit( Uint32 b,  Int32 n )  {
  putBit( b<<24,   /* significant bits to left long word limit */
      n );
}/* putHBit( ) */
/* puts the <n> least significant bits of the 32 bit value <b>
 * into buffer <bitmap>:  */
static void putLBit( Uint32 b,  Int32 n )  {
  putBit( b<<(32-n),  /* significant bits to left long word limit */
      n );
}/* putLBit( ) */
```

FIG. 10D

```
/****************************************************************
 *
 * Extern Function: makeCompressedBitmap ( )
 *
 * Encodes characters from a text string to run-length encoded data.
 *
 * Input: pointer to an already allocated buffer for the compressed bitmap
 *        and a text string which shall be encoded as SP
 * Output: the run-length coded (=compressed) bitmap
 *
 * Return value: byte length of the by this function just generated bitmap
 ****************************************************************/
extern Uint2 makeCompressedBitmap (
        Uint8   *startofBitmap,  /* OUT: destination of the compressed data */
        Uint32  topField,        /* 0: only bottom field; 1: only top field */
        char    *completeText,   /* text which shall be encoded as SP */
        Uint32  offsetLeft,      /* background pixel offset left */
        Uint32  offsetRight,     /* background pixel offset right */
        Uint32  offsetUp,        /* background pixel offset up */
        Uint32  offsetDown,      /* background pixel offset down */
        Uint32  *spWide,         /* OUT: will be set to the horizontal
                                    pixel size of the whole SP */
        Uint32  *spHight         /* OUT: will be set to the vertical
                                    pixel size of the whole SP */
        ) { char    *text;                  /* pointer to move inside <completeText> */
Uint32  lastNBackgroundPel;     /* count remaining background pel */
Uint32  row;                    /* geometrical row inside the SP */
Uint32  character;              /* character element no. of the char. set */
Uint32  n;                      /* bit counter for the run-length codes */

/* horizontal size of the SP in pel:  */
*spWide = (offsetLeft +
        strlen( completeText ) * (4+SPACE_BETWEEN_2_CHARACTERS) -
        SPACE-BETWEEN_2_CHARACTERS +
        offsetRight) ;
/* vertical size of the WHOLE (not only the field ! ) SP in pel: */
*spHight = offsetUp + N_ROWS + offsetDown;

/* init. pointer to move inside the compressed data area: */
bitmap = startOfBitmap;
/* upper background pixel offset of the SP */
for( row=topField; row<offsetUp; row +=2 )  {
  *bitmap++ = 0;
  *bitmap++ = 0;

/* encoding the actual text: */
for( row=(offsetUp+topField) &1; row<N_ROWS   row +=2 ) {
   text = completeText;              /* init text ptr */
   lastNBackgroundPel = offsetLeft;  /* left background pixel
   /* encode line <row> of the whole text */    * offset of the SP */
   while( *text ! = '\0' ) (/* encode line <row> of char. *text */ if( *text >='0'   && *text <= '9' )       /* it's a digit */
          character = (Uint32)(*text-,'0' );
```

FIG. 10E

```
else                                    /* it's a special char. */
  switch( *text ) {
  case ':': character = 10; break;
  default: character = 11; break;       /* use space as default */
  /* get leading background pixel: */
  n = lastNBackgroundPel + characterSet[ character ] [ row ] .nBeginningPel;

/* when there are pattern pixel for this row then encode those: */
  if( characterSet[ character ] [ row ] .nNibbel ) {

/* encode leading background pixel (if any): */
    while ( n ) {  /* generate run-length code    */
      if ( n<16 )
        if ( n<4 )
          putLBit( n, 2 );   /* put the 2 LSB of n onto bitmap */
        else
          putLBit( n, 6 );
      else
        if( n<64, )
          putLBit( n, 10 );
        else if( n<256)
          putLBit( n, 14 );
        else
          putLBit( 255, 14 );
      putHBit( 0, 2 );
      if( n >= 256 ) n -= 255;
      else    n = 0;
    }

/* insert preencoded character run-length code: */
    for( n=0; n<characterSet[ character ] [ row ] .nNibbel; n++ ) {
      if( n&!1 )   /* odd */
        putLBit( characterSet[ character ][ row ].runLengthcode[n>> 1], 4);
      else /* even */
        putHBit( characterSet[ character ][ row ].runLengthcode[n>> 1], 4);
    }
    /* prepare encoding of trailing background pixel    (if any): */
    lastNBackgroundPel = characterSet[ character ] [ row ] .nRemainingPel;

} else {/* there are no pattern pixel to encode */

/* prepare encoding of background pixel (if any): */ lastNBackgroundPel = n + characterSet[ character ] [ row ] .nRemainingPel
  }

/* insert space between 2 characters: */
  lastNBackgroundPel += SPACE_BETWEEN_2_CHARACTERS;
  text++; /* next character */
} /* while */
```

FIG. 10F

```
/* encode the remaining background pels of the current SP row: */
  n = lastNBackgroundPel + offsetRight - SPACE_BETWEEN_2_CHARACTERS
  if( n ) {
    if( n<16 )
      if( n<4 )
        putLBit( n, 2 ); /* put the 2 LSB of n onto bitmap */
      else putLBit( n, 6 );
    else
      if( n<64 )
        putLBit( n, 10 );
      else if( n<256 )
        putLBit( n, 14 );
      else
        putLBit( 0, 14 );
    putHBit( 0, 2 );

/* add nibbel stuffing in order to get the SP line byte aligned: */
    putAlign( );
} /* for row */

/* lower background pixel offset of the SP: */
for( row=(offsetUp+N_ROWS+topField)&1; row<offsetDown; row +=2 ) {
    *bitmap++ = 0;
    *bitmap++ = 0;
}

/* return the byte length of the just encoded compressed data */
return (Uint32) (bitmap - startOfBitmap);
} /* makeCompressedBitmap( ) */
```

```
/****************************************************************
 *
 * Extern Function: makeSPU( )
 *
 * Encodes characters from a text string to complete SPU
 *
 * Input: pointer to an already allocated buffer for the complete SPU
 *     and a text string which shall be encoded as SP
 * Output: the encoded SPU
 *
 * Return value: length of the whole SPU
 ****************************************************************/
extern Uint32 makeSPU ( )
        Uint8   ntsc,              /* 0: 625/50; 1: 525/60 */
        Uint8   *spuBuffer,        /* OUT: already allocated buffer for the SPU */
        char    *text,             /* this text shall be encoded as Sp */
        Uint32  durationInFrames,  /* after this no. of frames
                                    * the SP shall disappear */
        Uint32  starty             /* vertical start position of the SP */
        ) {
Uint32
    spWide,     /* horizontal size of SP (in pel) */
    spHeight,   /* vertical size of SP (in pel) */
    lenTop,     /* byte length of the top field compressed bitmap */
    lenBottom,  /* byte length of the bottom field compressed bitmap */
    startx;     /* start column of the SP on screen */
Uint32
    offset;     /* byte offset relative to the start of the SPU */ starty &= -1;   /* starty MUST be even */

/* generate run-length code for top field: */
lenTop   = makeCompressedBitmap( spUBuffer+4
                                 0,
                                 text,
                                 8, 8, 3, 3,
                                 &spWide, &spHeight );
/* generate run-length code for bottom field: */
lenBottom = makeCompressedBitmap( spuBuffer + 4 + lenTop,
                                  1,
                                  text,
                                  8, 8, 3, 3,
                                  &spWide, &spHeight );
/* place SP at horizontal screen center position: */
startx = (720 - spWide) / 2;

/* set offset to start of SP_DCSQT: */
offset = 4 + lenTop + lenBottom;

/* size of SP_DCSQT <= half of the size of SPU */
while (offset < 30)  spuBuffer [ offset++ ] = 0;
```

FIG. 10H

```
spuBuffer[0] = ((offset + 31)& -1) >> 8;          /* size of whole SPU */
spuBuffer[1] = ((offset + 31)& -1) & OxFF;
spuBuffer[2] = offset >> 8;                        /* start of SP_DSQ #0 */
spuBuffer[3] = offset & OxFF;
/*** DCSQ#0: ***/
spuBuffer[offset ] = 0x00;                         /* STM = 0 */
spuBuffer[offset+1] = 0x00;
spuBuffer[offset+2] = (offset + 24) >> 8;          /* ptr to next SP_DCSQ */
spuBuffer[offset+3] = (offset + 24) & OxFF;
spuBuffer[offset+4] = 0x03;      /* SET_COLOR b=0 p=1 e1=2 e2=3 */
spuBuffer[offset+5] = 0x32;
spuBuffer[offset+6] = 0x10;
spuBuffer[offset+7] = 0x04;      /* SET_CONTR (0..15) b=15 p=15 e1=15 e2=15 */
spuBuffer[offset+8] = OxFF;
spuBuffer[offset+9] = OxFF;
spuBuffer[offset+10] = 0x05; /* SET_DAREA */
spuBuffer[offset+11] = startx >> 4;
spuBuffer[offset+12] = ((startx << 4) + ( (startx + spWide - 1) >> 8)) & OxF3;
spuBuffer[offset+13] = (startx + spWide - 1) & OxFF;
spuBuffer[offset+14] = starty >> 4;
spuBuffer[offset+15] = ((starty << 4) + ((starty + spHeight - 1) >> 8)) & OxE3;
spuBuffer[offset+16] = (starty + spHeight - 1) & OxFF;
spuBuffer[offset+17] = 0x06;  /* SETDSPXA */
spuBuffer[offset+18] = 0x00;
spuBuffer[offset+19] = 0x04;
spuBuffer[offset+20] = (4+lenTop) >> 8;
spuBuffer[offset+21] = (4+lenTop) & OxFF;
spuBuffer[offset+22] = 0x01;  /* STA_DSP */
spuBuffer[offset+23] = OxFF;  /* CMD_END */
/*** SP_DCSQ#1:    ***/
if( ntsc )   { /* STM for NTSC: */
spuBuffer[offset+24] = (durationInFrames * 3003) >> 18;
spuBuffer[offset+25] = (durationInFrames * 3003) >> 10) & OxFF;
} else {     /* STM for PAL: */
spuBuffer[offset+24] = (durationInFrames * 225) >> 14;
spuBuffer[offset+25] = ((durationInFrames * 225) >> 6) & OxFF;
}
spuBuffer[offset+26] = spuBuffer[offset + 2];      /* ptr to Sp_DCSQ#1 */
spuBuffer[offset+27] = spuBuffer[offset + 3];

spuBuffer[offset+28] = 0x02;  /* STP_DSP */ spuBuffer[offset+29] = OxFF;  /* CMD_END */ if( offset&1 )  spuBuffer[offset + 30] = OxFF;   /* stuffing if necessary */
return ( offset + 31 )  & -1;   /* length of the whole SPU */
} /*   makeSpu( ) */
```

FIG. 10I

```
/************************************************************
 *
 * Extern Function: makeSPPack( )
 *
 * Generates a complete sub-picture pack.
 * Input: pointer to an already allocated buffer for the complete
 *
 *        2048 main data
 * Output: the encoded SP pack
 *
 * No return value
 *
 * Note: this simple version doesn't perform scrambled encoding
 ************************************************************/
extern void makeSPPack(
        Uint8   ntsc,            /* 0: 625/50;  1: 525/60 */
        Uint8   *packBuffer,     /* OUT: already allocated buffer for the SPU */
        char    *text,           /* this text shall be encoded as SP */
        Uint32  durationInFrames,/* after this no. of frames
                                  * the SP shall disappear */
        Uint32  starty,          /* vertical start position of the SP */
        Uint8   *scr,            /* 6 bytes SCR */
        Uint8   *pts,            /* 5 bytes PTS, must be on top field boundary! */
        Uint8   firstPacket,     /* 1:first packet of a VOB, else 0 */
        Uint8   spStreamNumber   /* SP stream number: 0..31 */
        ) {
Uint32 spuSize;
Uint32 pesPrivateDataSize = (firstPacket?3:0) ;

/* insert pack header: */
packBuffer[0] = 0x00;
packBuffer[1] = 0x00;
packBuffer[2] = 0x01;
packBuffer[3] = 0xBA;

packBuffer[4] = scr[0];
packBuffer[5] = scr[1];
packBuffer[6] = scr[2];
packBuffer[7] = scr[3];
packBuffer[8] = scr[4];
packBuffer[9] = scr[5];
packBuffer[10] = 0x01;
packBuffer[11] = 0x89;
packBuffer[12] = 0xC3;
```

FIG. 10J

```
packBuffer[13] = 0xF8;
/* insert SPU: */
spuSize = makeSpU( ntsc,
                   packBuffer + 14 + 14 + 1 + pesPrivateDataSize,
                   text,
                   durationInFrames,
                   starty );

/* insert packet header: */
packBuffer[14] = 0x00;
packBuffer[15] = 0x00;
packBuffer[16] = 0x01;
packBuffer[17] = 0xBD;

packBuffer[18] = (spuSize + 8 + 1 + pesPrivateDataSize) >> 8;
packBuffer[19] = (spuSize + 8 + 1 + pesPrivateDataSize) & 0xFF;

packBuffer[20] = 0x81;
packBuffer[21] = 0x80 + (firstpacket != 0);
packBuffer[22] = 5 + pesPrivateDataSize;

packBuffer[23] = pts[0];
packBuffer[24] = pts[1];
packBuffer[25] = pts[2];
packBuffer[26] = pts[3];
packBuffer[27] = pts[4];

if( pesPrivateDataSize ) {
  packBuffer[28] = 0x1E;
  packBuffer[29] = 0x60;
  packBuffer[30] = 58;
}

/* private data sub stream id; */
packBuffer [28 + pesPrivateDataSize] = 0x20 + (spStreamNumber&0x1F);

/* clear unused sector rest: */
while (spuSize + 14 + 14 + 1 + pesPrivateDataSize < 2048)
   packBuffer[ spuSize++ + 14 + 14 + 1 + pesPrivateDataSize ] = 0;
} /* makeSppack() */
```

```
/*----------------------------------------------------------------
 | Copyright (c) 1998. This software is the property of Thomson
 | multimedia, and shall not be reproduced, copied, or distributed
 | without written permission.
 -----------------------------------------------------------------*/
/* NTSC,
 * SP shall disappear after 123 frames,
 * vertical start position of the SP: 400,
 * scr contains the 6 bytes of SCR
 * pts contains the 5 bytes of PTS
 * it's the first SPU in this VOB,
 * it's SP stream #3 */
makeSPPack (1,       /* 0:    625/50;  1: 525/60 */
    mainData,        /* ptr to sector main data */
    "01 : 23 : 45 : 67 : 89",   /* this text shall be encoded as SP */
    123,             /* after this no. of frames
                      * the SP shall disappear */
    400,             /* vertical start position of the SP */
    scr,             /* 6 bytes SCR */
    pts,             /* 5 bytes PTS, must be on a top field! */
    1,               /* 1:first packet of a VOB, else 0 */
    3);              /* SP stream number: 0..31 */
/* PAL,
 * SP shall disappear after 50 frames,
 * vertical start position of the SP: 500,
 * scr contains the 6 bytes of SCR
 * pts contains the 5 bytes of PTS
 * it's NOT the first SPU in this VOB,
 * it's SP stream #31 */
makeSPPack (0,       /* 0: 625/50;     1: 525/60 */
    mainData,        /* ptr to sector main data */
    "0 1 2 3 4 5",   /* this text shall be encoded as SP */
    50,              /* after this no. of frames
                      * the SP shall disappear */
    500,             /* vertical start position of the SP */
    scr,             /* 6 bytes SCR */
    pts,             /* 5 bytes PTS, must be on a top field! */
    0,               /* 1:first packet of a VOB, else 0 */
    31);             /* SP stream number: 0..31 */
```

FIG. 11A

```
/* NTSC,
 * SP shall disappear after 60 frames,
 * vertical Start Position of the SP:   420,
 * scr contains the 6 bytes of SCR
 * pts contains the 5 bytes of PTS
 * it's NOT the first SPU in this VOB,
 * it's SP stream #0 */
makeSPPack (1,     /* 0:     625/50; 1: 525/60 */
    mainData,           /* ptr to sector main data */
    "00 : 01 : 45",     /* this text shall be encoded as SP */
    60,                 /* after this no. of frames
                         * the SP shall disappear */
    420,                /* vertical start position of the SP */
    scr,                /* 6 bytes SCR */
    pts,                /* 5 bytes PTS, must be on a top field! */
    0,                  /* 1:first packet of a VOB, else 0 */
    0);                 /* SP stream number: 0..31 */
```

FIG. 11B

```
/*----------------------------------------------------------
| Copyright (c) 1998, This text is the property of Thomson
| multimedia, and shall not be reproduced, copied, or distributed
| without written permission.
|                                                          */
------------------------------------------------------------
```

Note: values like 0xAB indicates hexadecimal values (C syntax).

/********************* THE FUNCTION CALL: *********************/

```
/* NTSC,
 * text:   "01:23",
 * SP shall be active for 123 frames
 * vertical start position of the SP: 400,
 * scr = {0x44, 0x00, 0x45, 0x46, 0xD4, 0xAB}
 * pts = {0x21, 0x00, 0x11, 0xDD, 0x09}
 * it's the first SPU in this VOB,
 * it's SP stream #3:*/
makeSPPack (
    1,              /* 0: 625/50; 1: 525/60 */
    mainData,       /* ptr to sector main data */
    "01:23",        /* this text shall be encoded as SP */
    123,            /* after this no. of frames
                     * the SP shall disappear */
    400,            /* vertical start position of the SP */
    scr,            /* 6 bytes SCR */
    pts,            /* 5 bytes PTS, must be on a top field! */
    1,              /* 1:first packet of a VOB, else 0 */
    3);             /* SP stream number: 0..31 */
```

/********************* THE RESULTING PACK: *********************/

```
hex-
addr    :    content of the pack (hex values)
------------------------------------------------------------
0000000:  00 00 01 BA 44 00 45 46 D4 AB 01 89 C3 F8 00 00
0000010:  01 BD 00 76 81 81 08 21 00 11 DD 09 1E 60 3A 23
0000020:  00 6A 00 4C 00 00 00 00 20 58 5C 92 45 85 85 85
0000030:  20 20 58 51 05 2C 51 45 24 20 58 51 05 24 51 45
0000040:  85 20 00 00 00 00 00 24 91 45 28 91 09 24 20
0000050:  58 58 54 51 05 1C 51 45 20 20 58 51 05 10 51 45
0000060:  1C 52 00 24 91 0D 20 11 C9 24 00 00 00 00 00 64
0000070:  03 32 10 04 FF FF 05 15 21 7D 19 01 9C 06 00 04
0000080:  00 26 01 FF 01 68 00 64 02 FF 00 00 00 00 00 00
0000090:  00 00 00 00 00 00 00 00 00 00 00 00 00 00 00 00
00000A0:  00 00 00 00 00 00 00 00 00 00 00 00 00 00 00 00
00000B0:  00 00 00 00 00 00 00 00 00 00 00 00 00 00 00 00
```

... (the remaining bytes till byte #2048 of the pack are all Zero)

FIG. 12A

```
/************************* ONLY THE SPU IN THE PACK: *************************/
hex
addr:    content of the pack (hex values)
─────────────────────────────────────────────────────────
0020: ################## SPUH:
0020: 00 6A                # SPDSZ     = 106 = 0x6A
0022: 00 4C                # SP_DCSQTA = 76 = 0x4C 0024: ################## PXD:
0024: 00 00 00 00 20 58 5C 92 45 85 85 85 20 20 58 51
0034: 05 2C 51 45 24 20 58 51 05 24 51 45 85 20 00 00
0044: 00 00 00 00 24 91 45 28 91 09 24 20 58 58 54 51
0054: 05 1C 51 45 20 20 58 51 05 10 51 45 1C 52 00 24
0064: 91 0D 20 11 C9 24 00 00

006c: ################## SP_DCSQT:
006c: ################## SP_DCSQ 0 = 0x0
006c: 00 00                # SP_DCSQ_STM = 0     = 0x0 = 0.0000s => start frame: 0
006E: 00 64                # SP_NXT_DCSQ_SA = 100 = 0x64
0070: 03 32 10             # SET_COLOR b=0 p=1 e1=2 e2=3
0073: 04 FF FF             # SET_CONTR (0..15) b=15 p=15 e1=15 e2=15
0076: 05 15 21 7D 19 01 9C # SET_DAREA sx=338 ex=381 sy=400 ey=412
007D: 06 00 04 00 26       # SET_DSPXA  uf=0x4   bf=0x26
0082: 01                   # STA_DSP
0083: FF                   # CMD_END
0084: ################## SP_DCSQ 1 = 0x1
0084: 01 B0                # SP_DCSQ_STM = 0x1B0 = 122.8800s
0084:                      #      => start frame: 123 (PAL)
0086: 00 64                # SP_NXT_DCSQ_SA = 100 = 0x64
0088: 02                   # STP_DSP
0089: FF                   # CMD_END /****************** THE RESULTING DECOMPRESSED SP: ******************/
The following simple graphic shows the presented (decoded) bitmap. The symbol
'.' indicates a background pixel and the symbol '#' indicates a pattern
pixel. The following bitmap represents a sub-picture with horizontal 44 pixel
and vertical 13 pixel.

The (simple) graphic:
```

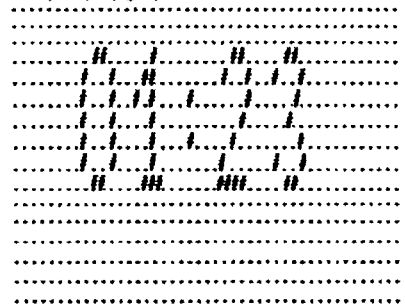

FIG. 12B

METHOD AND APPARATUS FOR THE RECORDING AND REPRODUCTION OF VIDEO AND/OR AUDIO SIGNALS

BACKGROUND OF THE INVENTION

The invention relates to a method for the recording and reproduction of video and/or audio signals in which an additional information item, in particular a title information item, is recorded in addition to the video and/or audio signal, which information item serves for subsequent insertion into the video picture during reproduction of the video signal and/or audio signal. The invention furthermore relates to a recording and reproduction apparatus for the recording and reproduction of video and/or audio signals in which the method for the recording and reproduction of video and/or audio signals is employed.

The invention relates to a method for the recording and reproduction of video signals. In this case, a method and an apparatus for magnetic recording and reproduction are disclosed in European Patent Specification EP 0 558 328. The apparatus described relates to an 8 mm video recorder. The apparatus affords the possibility of recording title data in addition to the video signal and the PCM audio data in a slanted track of the video tape. The title data, like the PCM audio data, are recorded digitally. In addition to the title data, it is possible to record control codes which determine the way in which the title data are presented. The separate storage of the title data makes it possible to afford the user a selection option which enables him to decide whether or not a title insertion is to take place.

From the development of DVD players, which have recently become commercially available, it is known to provide so-called sub-picture decoding devices for the display e.g. of subtitles on the screen of a television set. A description of such sub-picture decoding devices may also be found in the DVD Standard, DVD Specifications for read-only disc, part 3, video specification, Version 1.0, August 96, Section 5.4.3 Sub-picture Unit (SPU).

A more detailed description of such sub-picture decoding devices may also be found in EP-A-0 725 541, which also contains information regarding the encoding of sub-picture units (SPU) for the professional sector in the context of the production of DVD discs.

It is customary practice in many apparatuses appertaining to consumer electronics to insert status information items of the respective apparatus as well as operating instructions, etc., in the output video picture. Moreover, the use of so-called on-screen display menus (OSD) for operational control is widespread. It is customary nowadays for specialized microcontroller circuits with internal or external ROM and RAM memories to be used to generate such OSD menus or else status displays. These circuits are mainly designed such that the dot matrix-like pattern for each character that can be displayed is stored in the ROM memory. Characters that can be displayed should also include graphics characters with the aid of which, by way of example, appropriate bar charts can be composed. For an OSD menu, the requisite character codes are then transferred to a character generator which takes the associated dot matrix data from the ROM and generates the associated RGB signals at the correct locations in the picture and inserts them in the picture. The solution can also be configured for apparatuses with digital signal processing (including digital frame stores) in such a way that the pixel data are generated by the character generator and are written directly to the frame store at the corresponding locations. With regard to the DVD recording and reproduction apparatuses (DVD video recorder, DVD audio recorder, DVD camcorder) currently in development, the problem exists that, on the one hand, both the sub-picture decoding unit already mentioned must be implemented, with outlay on hardware, for the subtitles stored on the DVD disc and, on the other hand, additional title data are intended to be recorded for which a dedicated data pack has not been provided heretofore in the DVD Standard, with the result that, in the first instance, the only possibility remaining is for the title data to be integrated directly in the data packs for the video data, but this means that these title data are permanently connected with the video data and an option for selecting whether the title data are inserted into the video picture or are blanked out of the video picture no longer exists.

SUMMARY OF THE INVENTION

The object of the invention is to specify a method and an apparatus for the recording and reproduction of video and/or audio signals which make it possible, in particular for DVD recording and reproduction apparatuses, to separately store an additional information item, such as e.g. a title information item, in addition to the video and/or audio data, with the result that it becomes possible, without a high outlay on circuitry, to insert or blank the additional information item into or out of a video picture in a targeted manner. The object is achieved by means of the features of the claimed invention. The inventive solution in accordance with the present invention consists in converting the data for the additional information item into a sub-picture unit, which is recorded in at least one sub-picture data pack in addition to the data packs for the video and/or audio signal on the storage medium. This solution affords the advantage that it is not necessary to change the existing DVD Standard for the storage of additional information items, since the additional information items are converted into a sub-picture unit (SPU), which are already provided in any case in the Standard for DVD players. A further advantage is that a plurality of different additional information items can be recorded in this way without difficulty and, during reproduction, the user can select which of the additional information items he would like to have inserted, since even the existing DVD players already provide the option of selecting subtitles in different languages.

It is likewise advantageous that the outlay on circuitry at least for the reproduction of the additional information items is very low, since for this purpose use is made of the same sub-picture decoding unit which is also used otherwise during the decoding of the sub-picture unit for subtitles. An additional circuit can therefore be omitted in this case.

Advantageous developments and improvements of the present invention are specified in the claims. In particular, the fact that the sub-picture unit comprises a compressed bit map for the additional information items is defined by the present invention. This property is advantageous because a considerable amount of memory space can be saved as a result. The memory space obtained in this way can be used for concomitantly storing a plurality of different additional information items which can be inserted alternatively. Furthermore, the fact that a sub-picture unit comprises a table with control commands for the insertion representing the additional information item is defined in the present invention. Commands of this type are already known from the DVD Standard. They allow diverse possibilities for configuring the insertions. Thus, graphical symbols can also be inserted, and it is possible to use different types of highlighting for characters etc. Therefore, the additional information item is not just restricted purely to text information, it can also relate to specific symbols and graphics.

By way of example, in accordance with the present invention, run length coding can advantageously be used for the compression of the bit map. This is simple to implement.

According to the present invention, the additional information item can be input by an operator or else be machine-generated, such as e.g. in the case of insertion of the playing time or of the time of day and of the date.

A very advantageous measure is also specified, which prescribes the provision of a table with characters that are already run length-coded, from which table the characters required for the additional information items are selected and are combined to form the resultant bit map of the sub-picture unit. This considerably simplifies the routine coding process. The concrete specifications which are made in the table for each character are also specified. A number of different additional information items which can be recorded are also specified.

A programming option which enables the user to pre-scribe the order in which the additional information items that he desires are to be successively inserted can also advantageously be provided in the method according to the invention.

A corresponding recording and reproduction apparatus for the recording and reproduction of video and/or audio signals in which an additional information item can additionally be recorded is also specified.

BRIEF DESCRIPTION OF THE DRAWINGS

Exemplary embodiments of the invention are illustrated in the drawings and are explained in more detail in the description below. In the drawings:

FIG. 10 shows a program listing for an example of a program for real-time sub-picture data pack generation;

FIG. 11 shows three examples of function calls relating to the program in FIG. 10;

FIG. 12 shows a fourth, more detailed example of a function call, and

DESCRIPTION OF THE PREFERRED EMBODIMENTS

Figure 1:
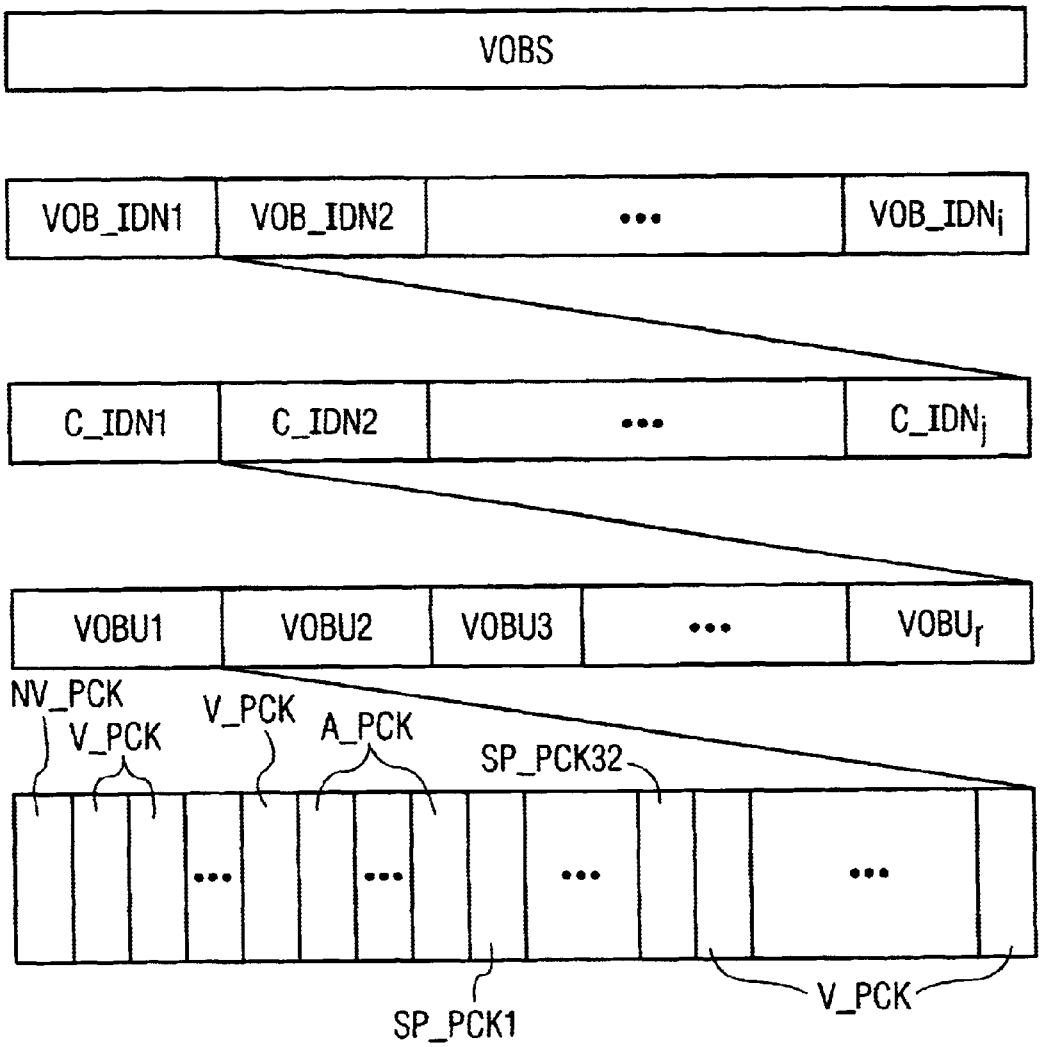
FIG. 1 shows the division of the recorded data stream of a DVD into video data packs, audio data packs and sub-picture data packs.
Figure 2:
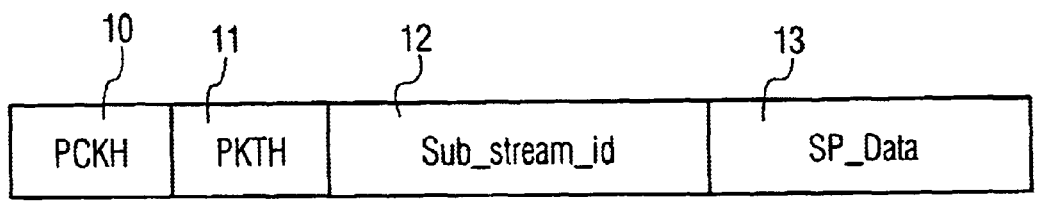
FIG. 2, shows the structure of a sub-picture data pack.

FIG. 1 illustrates the structure of a video object set (VOBS) in accordance with the DVD Standard mentioned in the introduction. A video object set is part of the logical data structure of a DVD video disc which is described in very precise detail in the DVD Standard. Further data units are also stored on a DVD disc, but they will not be discussed in more detail since they do not comprise the video and audio data and the data for a sub-picture unit which are important for the invention described in this case. With regard to the other data units, therefore, reference is made to the DVD Standard. As illustrated in FIG. 1, a video object set (VOBS) comprises a number of video objects designated by VOB_IDNi in FIG. 1. Each video object comprises an MPEG program stream, which is composed of a group of elementary streams. Five different types of elementary streams exist in this case, namely Video, Audio, Sub-picture, PCI and DSI. Each elementary stream comprises a number of access units. Such access units are, by way of example, Group of pictures (GOP), Audio frame, Sub-picture Unit, PCI pack and DSI pack. The video objects are then divided into so-called cells, which are likewise illustrated in FIG. 1 and are designated by the reference symbols C_IDN1–C_TDNj. These cells in turn are divided into video object units (VOBU). The VOB units are each part of a video object. Their presentation time lasts from between 0.4 and 1 second, so that each video object unit comprises e.g. a number of GOPs relating to twelve video pictures, for example. Accordingly, the same volume of data is also present for the audio data and/or for the data of a sub-picture unit. The exemplary structure of a video object unit is likewise illustrated in FIG. 1. A navigation pack NV_PCK is placed at the start of each video object unit VOBU. This is then followed by video packs V_PCK and audio packs A_PCK as well as sub-picture data packs SP_PCK in a variable order. These packs are designated as "Packs" in the DVD Standard and, for their part, they each comprise in turn a number of sub-packs, which are designated as "Packets" in the DVD Standard. However, this further distinction is of secondary importance for the description of this invention, so that in the text below the NV, V, A and SP Packs are designated as NV, V, A and SP data packs in this translation retranslated from the German. The structure of a data pack for a sub-picture unit (SP_PCK) is illustrated in FIG. 2. The header information items for SP_PCK and SP_PKT are succeeded by a detail SUB_Stream_ID, which enables 32 different sub-picture units to be distinguished. This is then followed by the actual data of the sub-picture unit. With regard to the individual details in the pack header and packet header, reference is made to the DVD Standard.

Figure 3:
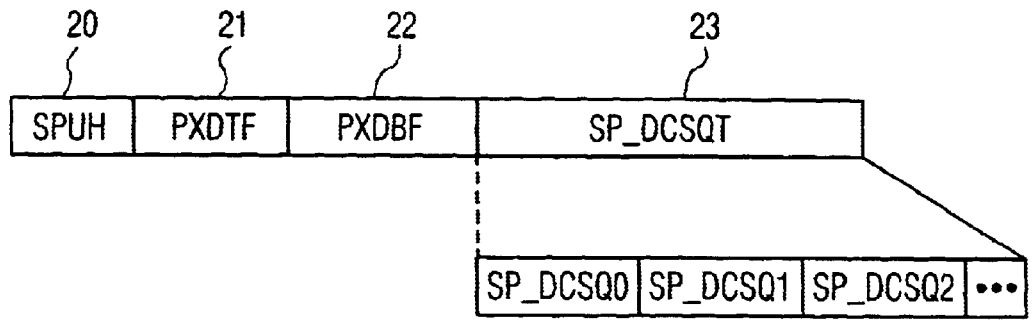
FIG. 3 shows the structure of a sub-picture unit.

FIG. 3 roughly illustrates the known data format of a so-called sub-picture unit (SPU) in accordance with the DVD Standard. The reference numeral 20 designates a data field for a header section (SPUH) of the sub-picture unit. The reference numeral 21 designates a data field for the compressed pixel data of a first field of the sub-picture (PXDTF) and the reference numeral 22 correspondingly designates a data field for the compressed pixel data (PXDBF) of the second field of the sub-picture. Finally the reference numeral 23 designates a data field for a display control command sequence, table (SP_DCSQT). So-called display control command sequences (SP_DCSQ) are stored in the data field 23. The individual display control commands will not be discussed in more detail here because they are explained in detail very precisely in the known DVD Standard, so that express reference is therefore made to this publication for the disclosure of the invention. FIG. 3 illustrates, moreover, that the table for the display control command sequences can comprise a plurality of display control command sequences which are designated by SP_DCSQ0–DCSQ2 in FIG. 3.

Figure 4:
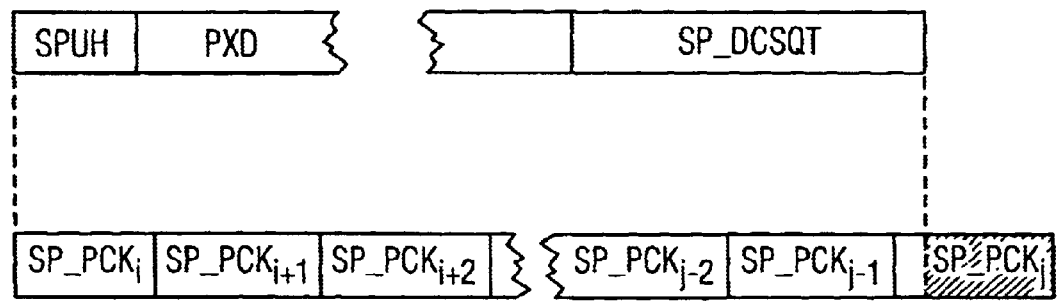
FIG. 4 shows the division of a sub-picture unit into a number of sub-picture data packs.

FIG. 4 shows, furthermore, that a sub-picture unit may actually be so large that it must be stored in a plurality of successive sub-picture data packs SP_PCKi–SP_PCKj.

The pixel data in the data fields 21 and 22 of the sub-picture unit determine the displayed pattern of the sub-picture. For each pixel of a row of the sub-picture, a data word 2 bits wide specifies whether the pixel is a character pixel or a background pixel or whether the pixel is to be highlighted in a first manner or in a second manner. These four distinctions can be made using two bits. In this case, the following binary values specifically denote:

00=background pixel,
01=character pixel,
10=pixel displayed with highlighting 1,
11=pixel displayed with highlighting 2.

It must be taken into account in this case that the individual pixel data are not stored in this pure form but rather in compressed form. Run length coding is used for this purpose. The concrete run length coding method will be explained in more detail below.

Figure 5:
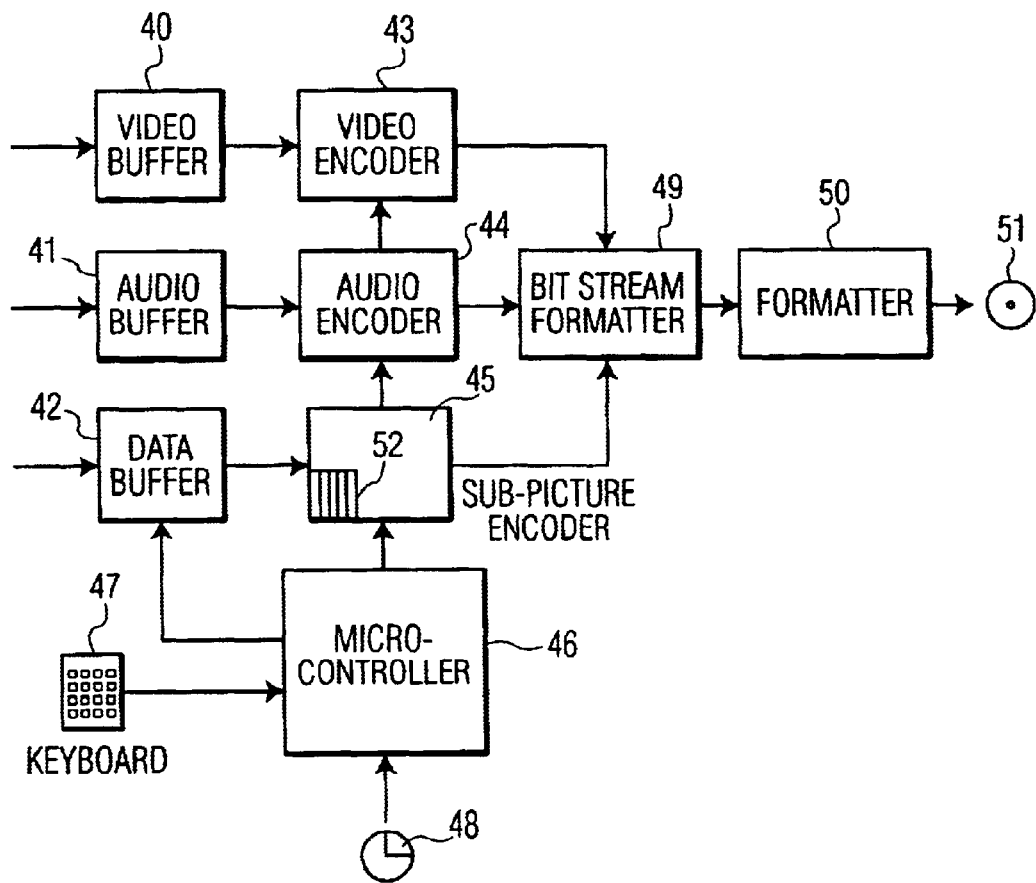
FIG. 5 shows a block diagram concerning the recording part of the recording and reproduction apparatus.
Figure 6:
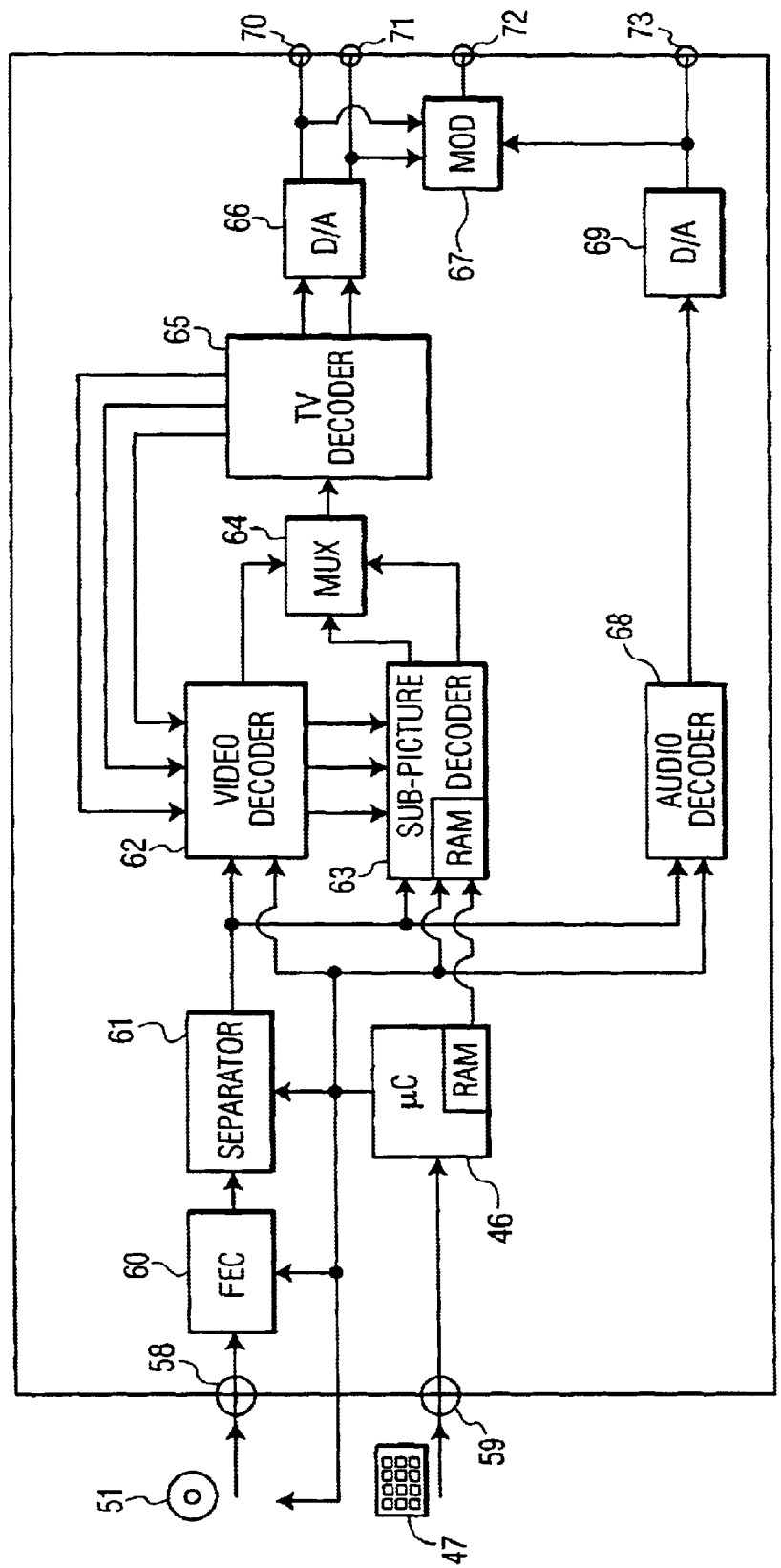
FIG. 6 shows a block diagram of the reproduction part of the recording and reproduction apparatus.

The structure of a recording and reproduction apparatus according to the invention will be described next with reference to FIGS. 5 and 6. It should be taken into account in this case that all the essential components which are regarded as essential for the recording function of the apparatus are illustrated here in FIG. 5 and all the essential components for the reproduction of the recorded data are illustrated in FIG. 6. Identical reference numerals in each case designate the same components in FIGS. 5 and 6. The reference numeral 40 designates a buffer store for the video data to be recorded. The video data originate from an appropriate data source such as, for example, a video camera or else from a broadband cable or satellite receiver or an antenna for terrestrial reception. The incoming data are already present in digital form however. The video data available in the buffer store 40 are processed by an MPEG2 video encoder circuit 43, in which the data are coded in accordance with the MPEG2 video standard. The data coded in this way are made available to a bit stream formatting unit 49, in which the data are assembled in such a way that a bit stream corresponding to the logical data format of the DVD Standard is generated at the output. In the formatting unit 50 that is also provided, the data are formatted again, with the result that the data are assembled in the correct physical order and can be used directly for recording on the DVD disc 51. The reference numeral 41 designates the data buffer for the audio data. The data located therein are processed by the audio coding circuit 44, which may be, for example, either an MPEG audio encoding circuit or a DOLBY AC3 audio encoding circuit. The data thus generated are made available in turn to the data formatting unit 49.

The reference numeral 47 designates a keyboard unit. The latter is connected to a microcontroller 46. The user can carry out inputs via the keyboard unit 47. In particular, he can input e.g. a desired title which is to be concomitantly recorded. Of course, any other desired inputs are equally well possible by this means. In the microcontroller 46, the data that have been input are likewise ordered logically again and then forwarded to a buffer store 42. The data located therein are revised by a sub-picture coding unit 45. A sub-picture unit for the data that have been input is generated in the sub-picture coding unit 45. The said sub-picture unit is then forwarded to the data formatting unit 49. The formation of the data packs for the video data packs, audio data packs and sub-picture data packs can preferably be performed in the data formatting unit 49.

A real-time clock 48 is additionally connected to the microcontroller 46. Time-of-day data and also date details can be communicated by the said real-time clock. These data and details are then also converted by the microcontroller 46 and can be used for special insertions (sub-picture insertions). It has not been mentioned heretofore that the recorded data are protected by multiple error protection. This task can also be undertaken by the formatting unit 50.

As an alternative, the sub-picture encoding unit 45 may also be integrated in the microcontroller 46 if the latter is correspondingly powerful enough.

The block diagram of FIG. 6 is explained below; FIG. 6 illustrates the essential components used during reproduction of the recorded data. The reference numeral 58 designates a serial data input, where a bit stream is present which contains both video data and audio data and the data for the sub-pictures. The data are supplied by an optical storage disc DVD 51. The incoming data are then initially subjected to error detection and correction in a correction unit 60. The data subsequently pass into a separator circuit 61, in which the video, audio and sub-picture data, which are still mixed together, are separated and respectively transferred accordingly either to a video decoding unit 62, a sub-picture decoding unit 63 or to an audio decoding unit 68. The decoded video and sub-picture data are made available to a multiplexing unit 64. The multiplexing unit 64 is controlled by the sub-picture decoding unit 63. At the output of the multiplexing unit 64, the data for the individual pixels of the video picture are successively input into a TV signal decoding device 65. The standard-conforming luminance and chrominance signals (Y, C) are output in digital form at the outputs of the TV signal encoding device (PAL, SECAM, NTSC). These signals are subsequently converted into analog signals in the D/A conversion unit 66 and forwarded to corresponding outputs 70, 71. The associated audio signal is already generated in a standard-conforming manner in the decoding device 68 and converted into an analog audio signal (only a mono signal is illustrated in this case) in the D/A conversion unit 69. This audio signal is made available at the output 73.

In another embodiment, the audio signal may also be output in digital form. This signal must be processed further in an external decoder in that case.

On the other hand, the embodiment may also be such that the analog luminance and chrominance signals and the audio signal are modulated onto different carriers in a modulation unit 67 and output as a corresponding V signal via just one output 72.

The reference numeral 59 designates an additional input for the keyboard unit 47. The input can also be embodied as an infrared input if the keyboard is integrated on a remote control. The microcontroller 46 serves to control the units 60, 61, 62, 63, 68. After a corresponding selection command has been input, the microcontroller 46 sets e.g. the sub-picture decoding unit 63 in such a way that it decodes only that sub-picture unit in accordance with the input. All other sub-picture units that may be present are then ignored. The sub-picture decoding unit 63 then inputs the decoded data into the bit stream for the entire video picture at the preprogrammed locations. For this purpose, the sub-picture decoding unit 63 drives the multiplexing unit 64 with correct timing in accordance with the horizontal and vertical sync pulses, input into the said unit by the TV signal encoding device 65, and the pixel clock signal. Further details concerning the structure and the method of operation of such a sub-picture decoding unit 63 are contained in EP-A-0 725 541. In this regard, therefore, reference is expressly made to this document as well.

Since the essential difficulty of the invention resides in generating the sub-picture unit under real-time conditions for a title insertion, an example of a program for sub-picture data pack generation is explained below with reference to the flow diagrams of FIGS. 7–9. The compressed bit map which is used for the sub-picture unit is generated from a prescribed ASCII text by means of the program according to FIG. 7.

Figure 8:
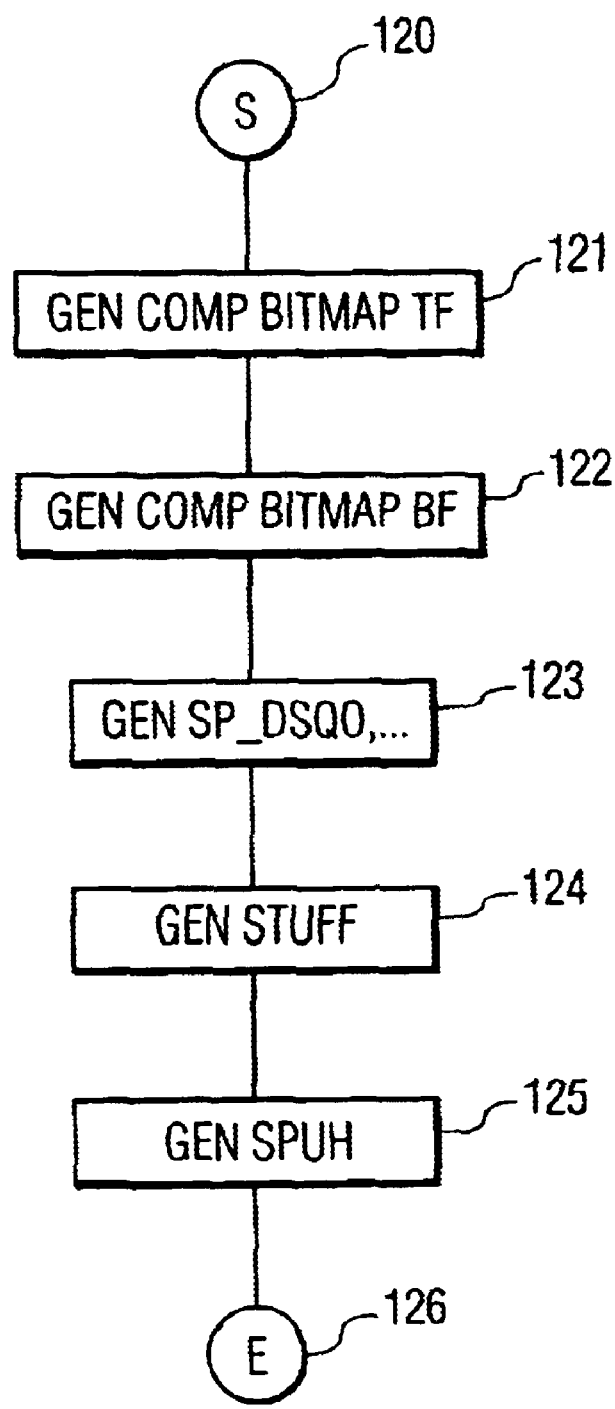
FIG. 8 shows a flow diagram for the conversion of the additional information item into a sub-picture unit.

A completely executable sub-picture unit is generated from the compressed bit map generated previously by means of the program in accordance with FIG. 8. Then, finally, a complete sub-picture data pack is generated with the aid of the sub-picture unit generated by means of the program in accordance with FIG. 9. This sub-picture data pack can then be inserted directly into the sector stream of a video object unit VOBU. The precise way in which this is to be done is already disclosed by the DVD Standard and, therefore, need not be explained in any further detail here.

First of all the function for generating the compressed bit map is explained. The function starts in program step 100. Variables are set in program step 101. In this case, in particular the horizontal and vertical pixel extent of the entire sub-picture is stored in special variables. Furthermore, the running variables used are also initialized. In program step 102, the number of background pixels of the sub-picture before the first character pixel is determined and buffer-stored. In the next program step 103, a check is then made to see whether the running variable ROW is greater than 7. Since this running variable was reset in program step 101, this will not yet be the case at this point in time. The program is then continued with program step 104, in which a check is made to see whether the last character of the input text has been reached. If not, the number under which the first character to be coded can be found in the table prepared is determined in program step 105. Subsequently, in program step 106 the run length code for the number of background pixels before the first character pixel of the character to be processed is generated and buffer-stored. In program step 107, the run length code of the pixel row of the character to be processed is then copied from the table and buffer-stored. In program step 108, the number of succeeding background pixels after the last character pixel of the character is then determined and buffer-stored. Afterwards, in program step 109, the next character to be processed is selected. All the characters are subjected to run length coding in this way. It ought to be noted in this case that the number of background pixels situated before the first character pixel must in each case be calculated anew in program step 106, to be precise from the value determined in step 108 and the table entry for the current character. If it has then been ascertained in program step 104 that the last character has been reached, in program step 110 the counter for the pixel rows is advanced by two rows and the counter for the character number is reset to 1. Furthermore, the remaining number of background pixels is determined and the associated run length code is determined in this program step. Finally, another check is then made to see whether the entire run length code generated for the pixel row can be accommodated in an integer number of bytes. If not, the coded pixel row is also correspondingly lengthened by 4 zero bits (1 nibble) in this case, so that the coded pixel row ends on a byte boundary. The data of a pixel row that are obtained in this way are correspondingly stored. All the pixel rows are generated in order in this way. If it is then ascertained in program step 103 that the pixel row number ROW is greater than 7, the method continues with program step 111, in which the empty pixel rows situated underneath the characters, with background pixels, are additionally subjected to run length coding. The program then ends with program step 112.

Figure 7:
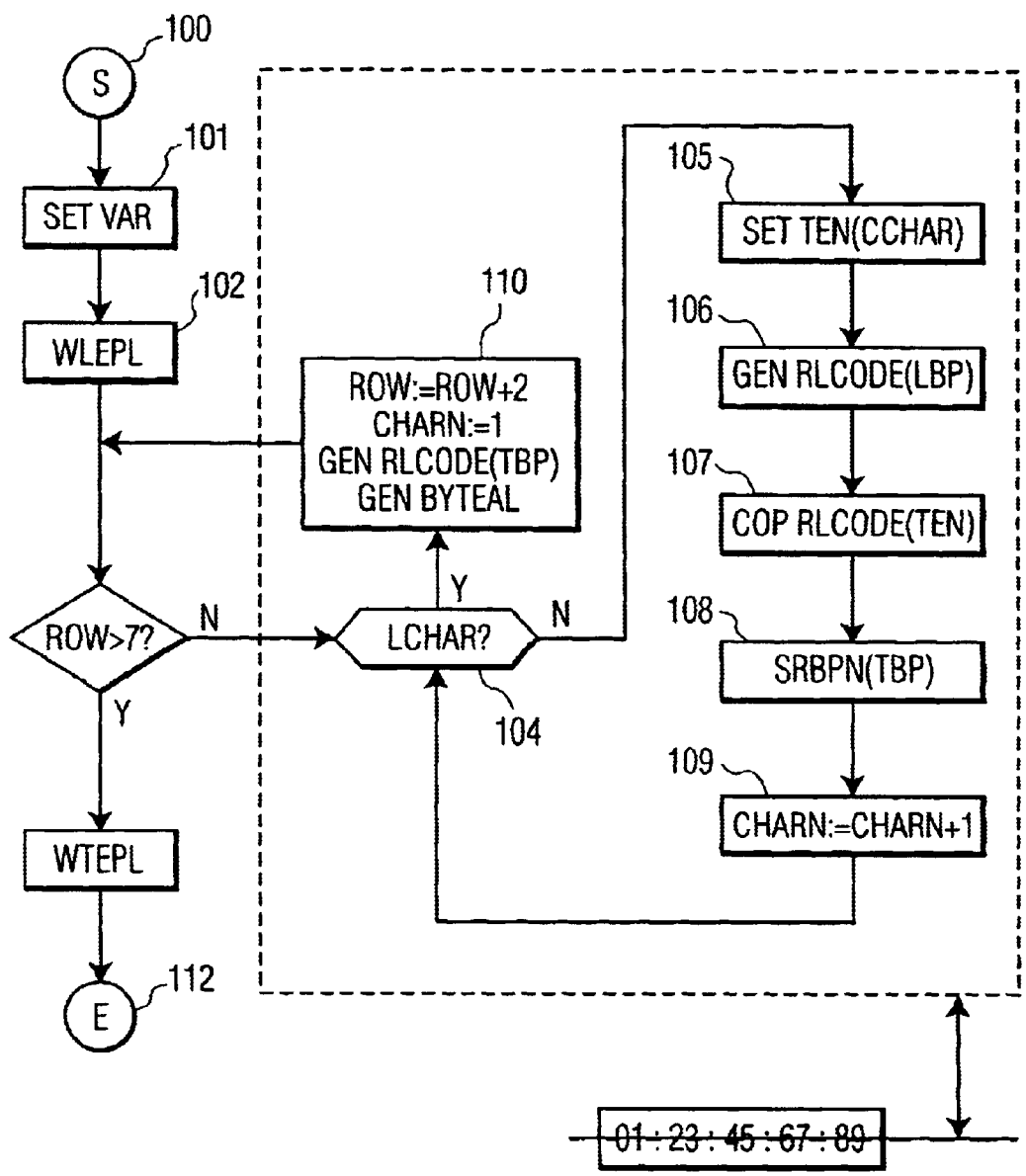
FIG. 7 shows a flow diagram for a program for generating the compressed bit map of a sub-picture unit.

It should also be mentioned that the program presented in FIG. 7 serves for generating the compressed bit map of one field (first or second field). For generating the compressed bit map for the other field, a corresponding program is then applicable in which different starting values are used for the running variables. The program steps which are necessary in order to process a pixel row and to subject the pixel values thereof to run length coding are marked by the dashed region in FIG. 7. This is indicated by the illustration of the exemplary sub-picture in the lower part of FIG. 7.

After the generation of the compressed bit map for the first and second fields, the complete sub-picture unit. SPU is then generated in accordance with the program according to FIG. 8. This program begins in program step 120; it contains a block for the generation of the compressed bit map data of the first field in program step 121 and of the second field in program step 122. In these program steps, then, the program is processed in each case according to FIG. 7. The generation of the requisite display control command sequences for the sub-picture unit then follows in program step 123. The starting instant and the end of the insertion of the sub-picture into the video picture, and also e.g. the position of the insertion on the screen, are defined therein by means of the corresponding commands. Since these commands and their application are defined by the DVD Standard, reference is made thereto at this point. In program step 124, the length of the display control command sequence table that has been assembled up to that point is then additionally checked. According to the DVD Standard, this length must be less than or equal to half the size of the entire sub-picture unit. If this rule is not yet fulfilled, stuffing bits are added so that the rule is fulfilled.

Finally, in program step 125, the introductory header section SPUH of the sub-picture unit is also generated in accordance with the rules of the DVD Standard. The program ends in program step 126.

Figure 9:
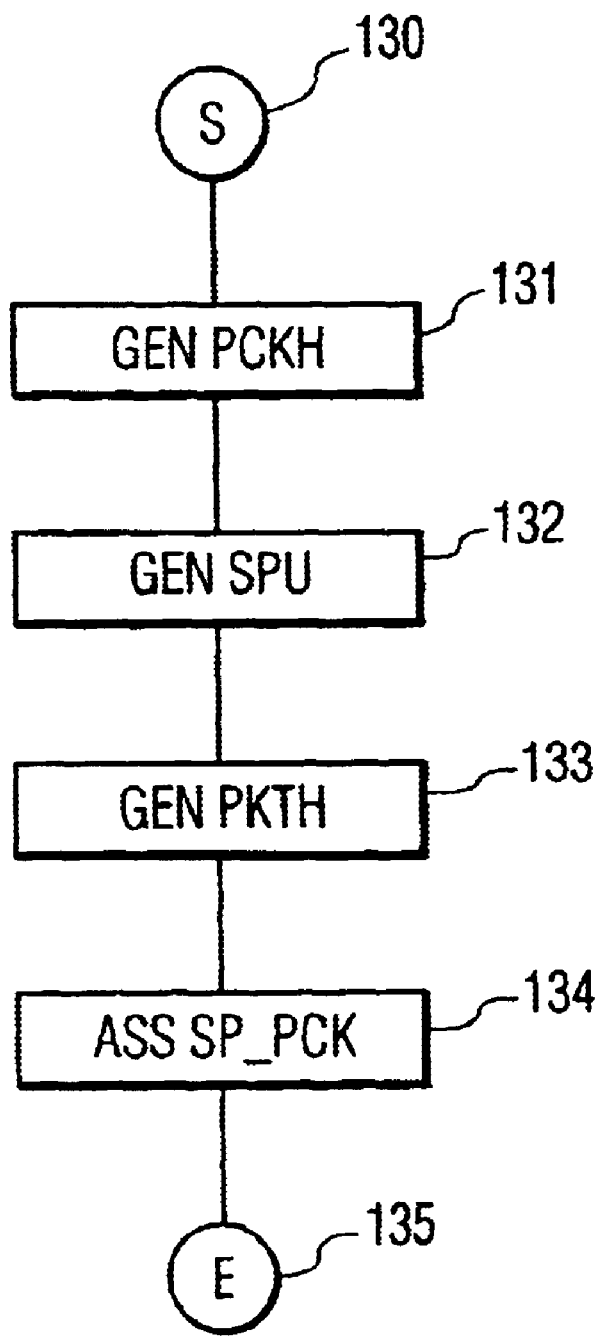
FIG. 9 shows a rough flow diagram for a program for generating the sub-picture data packs from the additional information items.

A corresponding sub-picture data pack is generated from the data generated up to that point for the sub-picture unit by means of the third flow diagram in accordance with FIG. 9. This program section starts in program step 130. The header section of the sub-picture data pack is generated by program step 131. The "Pack Header" in accordance with the DVD Standard is involved in this case. This function is also adequately described in the DVD Standard and, therefore, need not be explained in any more detail. In program step 132, the sub-picture unit is generated in the manner explained above in accordance with FIG. 8. The data are buffer-stored until the concluding generation of the pack. The header section of the packet ("Packet Header") is generated in program step 133. In this case, it is assumed that the sub-picture unit can be packed into a single packet. Otherwise a plurality of packets would have to be generated. Finally, all the parts are combined and the finished data pack is generated and made available for recording. This is done in program step 134. The program then ends with program step 135.

Figure 10C:
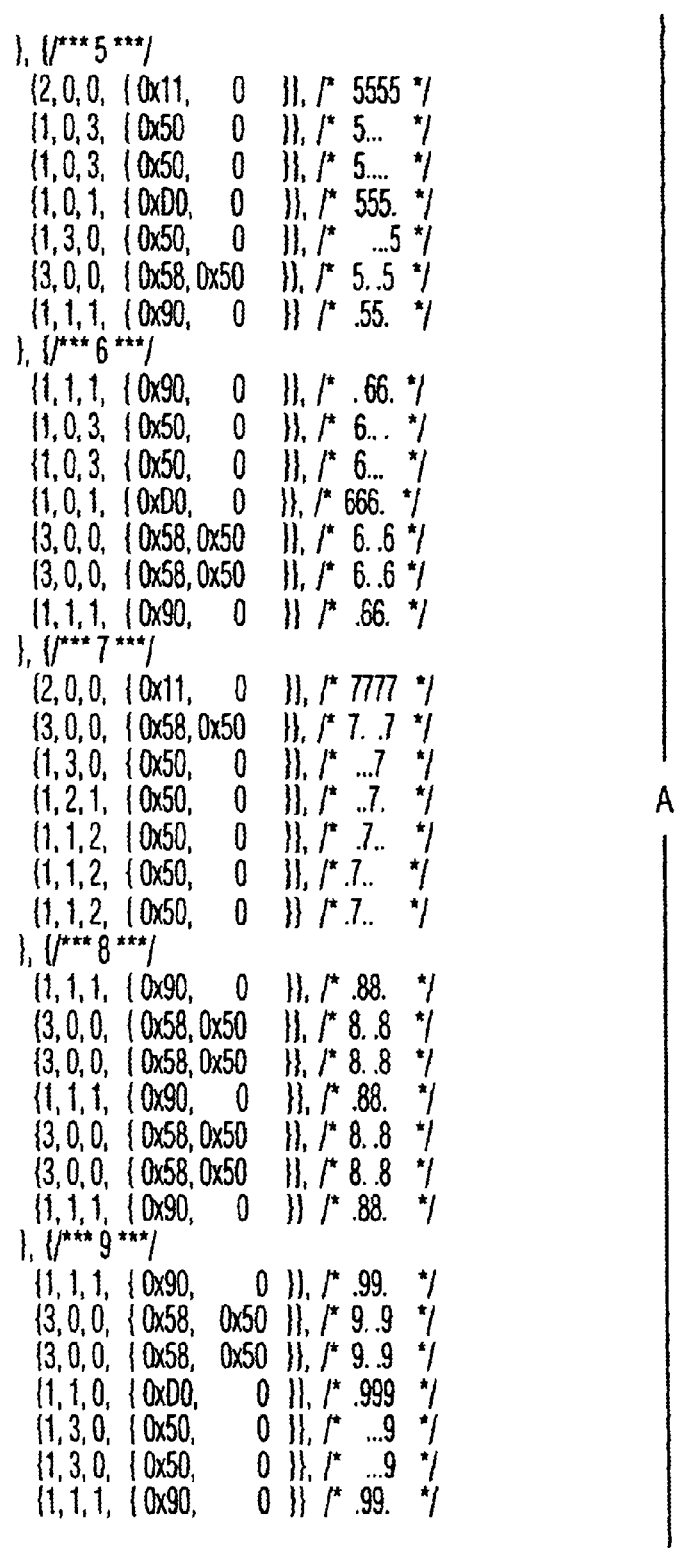

To provide a closer understanding of the functions of the real-time sub-picture data pack generation, FIG. 10 represents a program listing which was written in the ANSI C programming language and which contains the three program sections explained above in accordance with FIGS. 7–9. The table of the run length-coded characters is listed in the first part of the program listing (see section A). In order to simplify the program listing, only the ten digits 0–9 as well as the space character and the colon have been listed in the table. Moreover, a dot matrix of 4×7 dots has been used for each character. By virtue of the use of the table with characters that have already been subjected to run length coding, the program can operate very fast and, consequently, is particularly suitable for the real-time capability that is demanded here. If larger dot matrices, e.g. 10×16 pixels, are used instead of the dot matrix of 4×7 pixels used per character, the advantage of preceding all the characters rises since the complexity of the run length coding then increases. A larger character set should normally be used in any case, in order that the title displays are also possible with letters. In addition, relatively large letters should be used, in order that they can be discerned better on the screen. Furthermore, bit map generation that saves a great deal of memory yet is very fast nonetheless is possible by virtue of the structure of the table, since it contains the number of leading (left-hand) background pixels and the number of trailing (right-hand) background pixels as run length for each pixel row of a character. That enables run length coding in a pixel row from one character to the next which is simple in terms of programming and, for the processor, is fast and at the same time optimized in terms of memory. As a result, for by far the majority of applications, such compact coding of the sub-picture data packs is achieved that there is space for such data packs in a single sector, without difficulty. Consequently, only a minimum of memory is required on the DVD disc for a sub-picture unit generated in this way.

In the program listing, seven pixel rows are described for each character in the table. Each pixel row description of the table contains precisely four entries:

1. length of the run length code of each pixel row in nibbles,
2. number of background pixels until the first character pixel of the character in this pixel row,
3. number of background pixels after the last character pixel of the character in this pixel row,
4. run length code of this pixel row without leading and trailing background pixels.

The table entries for the character "0" are listed as an example. In this case, the following denote: "."=background pixel and "+"=character pixel:

First row: .++.

Second row: +..+

Third row: +..+

Fourth row: +..+

Fifth row: +..+

Sixth row: +..+

Seventh row: .++.

By way of example, the following four table entries are produced for the second row ("+..+")

1. 3 nibbles (run length code is 585h, see under 4.)
2. zero background pixels to the left of the first "+" pixel
3. zero background pixels to the right of the last "+" pixel
4. 585h (composed of two character pixels having the respective run length; 1 (binary: 01) and the character pixel code 01 (binary) from this follows the character binary 0101=decimal 5 and the run length code 8 (binary: 1000) for the two inner background pixels. The character pixel+two background pixels+one character pixel=5+8+5→585h).

By way of example, the following four table entries are produced for the seventh row (".++."):

1. one nibble (run length code is just the one 9, see under 4.)
2. one background pixel to the left of the first character pixel
3. one background pixel to the right of the last character pixel
4. 9 (composed of the run length 2 (binary: 10) and the character pixel code 01 (binary) from this follows binary 1001=decimal 9)

The function for generating the compressed bit map of the sub-picture unit is listed in that part of the program listing which is marked with section B. The program source text for generating the sub-picture unit is listed in that section of the program which is designated by the letter C. The program source text for the function for generating the sub-picture data pack is listed in the last section, which is identified by D. The program listing is provided with the corresponding comments, so that the individual sections of the program can easily be identified. In order to keep the example as simple as possible, however, error handling has been dispensed with to a very great extent.

Three examples of function calls are then also listed in FIG. 11. The corresponding listing is likewise written in ANSI-C. In the first example, the text "01:23:45:67:89" is prescribed as the text string. The program then automatically generates the associated sub-picture unit. In the second example, the text "0 1 2 3 4 5" is transferred as the text string. Finally, in the third example, the current playing time of the corresponding stop-clock is prescribed as the text string. A playing time of "00:01:45" is prescribed as an example.

A fourth example of a function call is then also specified in FIG. 12. The resulting hexadecimal numbers of the sub-picture data pack are then specified underneath. Finally, the hexadecimal numbers and corresponding comments for the sub-picture unit situated in the pack are listed underneath. Finally, a simple graphic also follows which symbolizes the displayed sub-picture in accordance with the sub-picture unit represented above it.

Figure 13A:
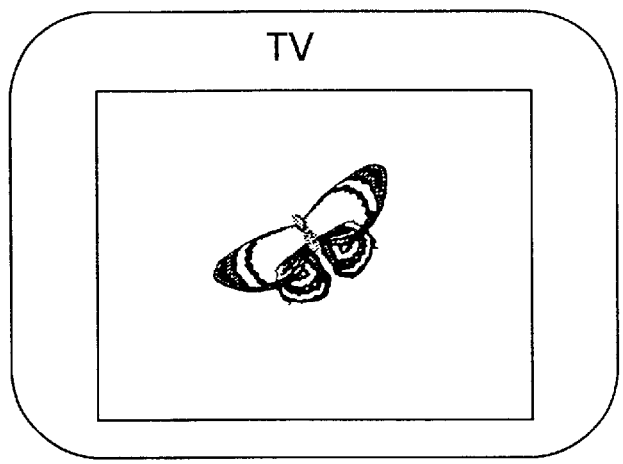
FIGS. 13a–13i show eight examples of applications for additional information insertions.
Figure 13B:
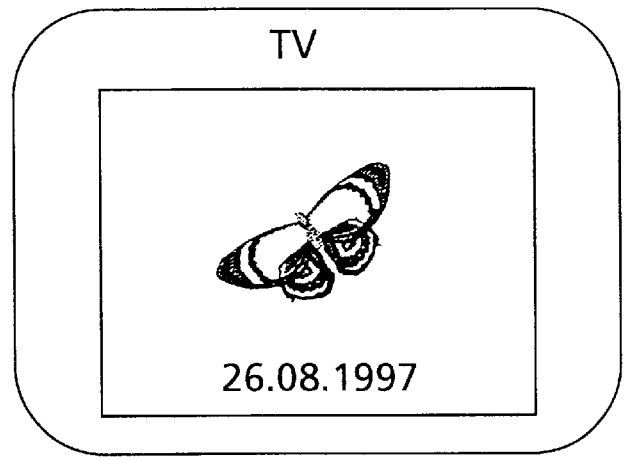
Figure 13C:
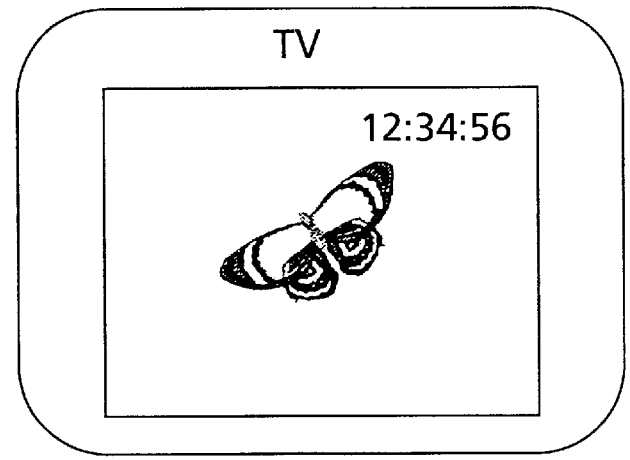
Figure 13D:
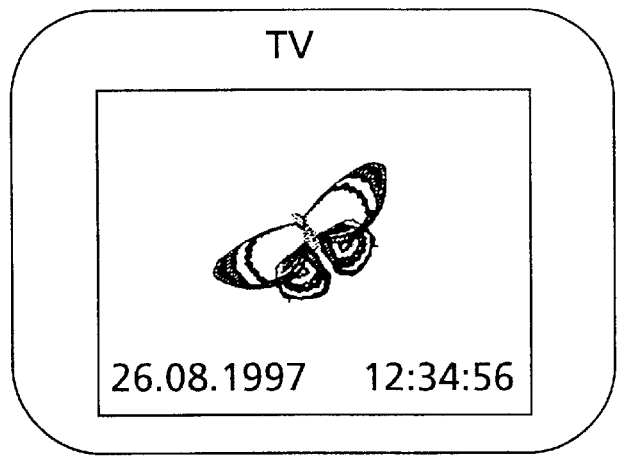
Figure 13E:
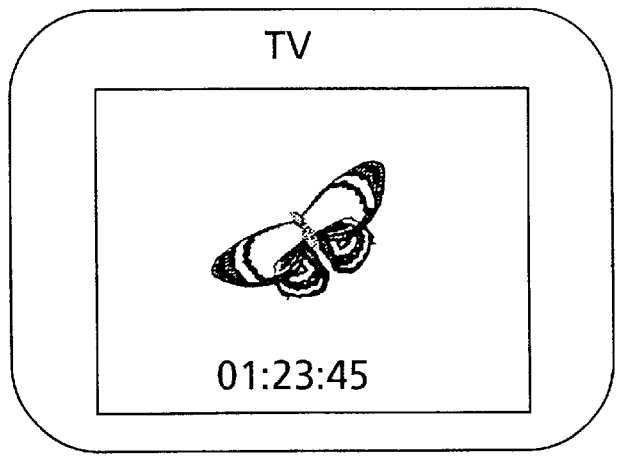
Figure 13F:
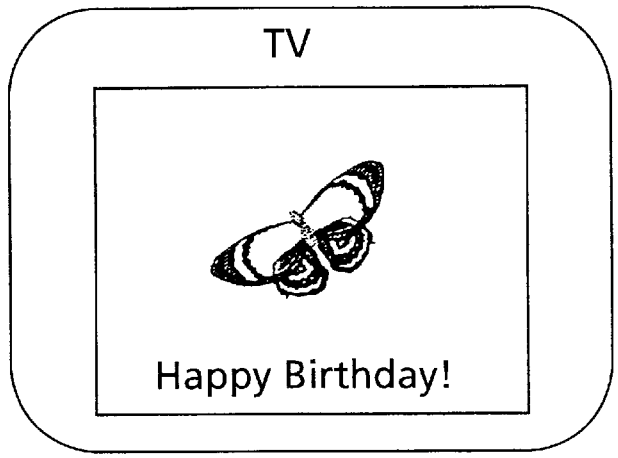
Figure 13G:
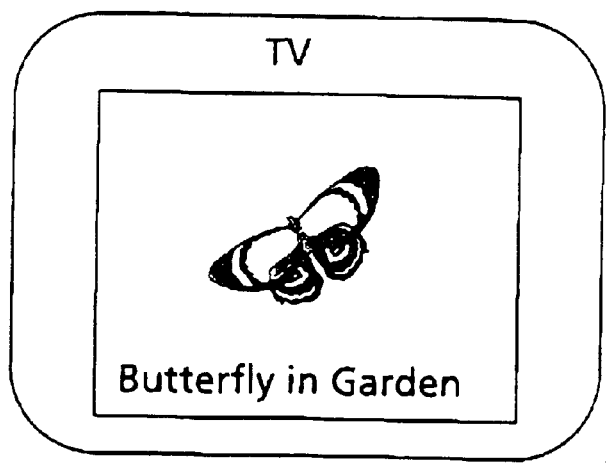
Figure 13H:
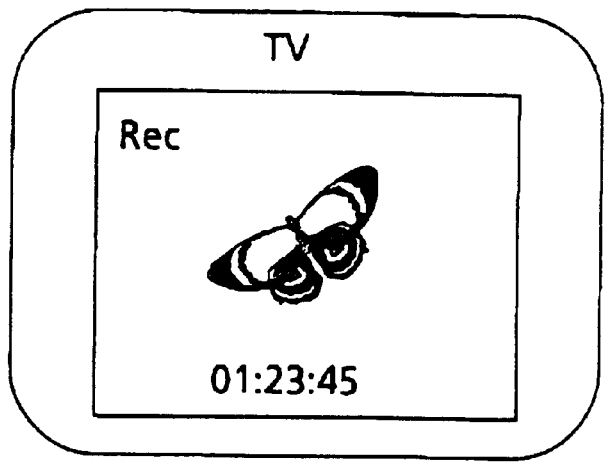
Figure 13I:
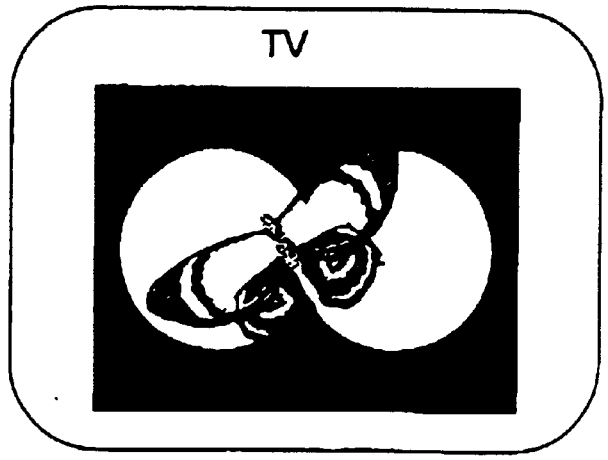

FIGS. 13a–j illustrate various application possibilities. In accordance with FIG. 13a, the display on a screen is such that no sub-picture is inserted. Consequently, the sub-picture decoding unit does not output a picture. In FIG. 13b, e.g. the recording date is inserted into the picture. In FIG. 13c, the recording time of day is inserted into the picture. In FIG. 13d, the date and time of day are inserted simultaneously as sub-picture. This does not then require, however, that two different sub-picture units be coded, rather a common sub-picture unit comprises the two information items. In FIG. 13e, the current playing time is inserted in the picture. In FIG. 13f, a special text prescribed by the user is inserted into the picture. In FIG. 13g, a title of a recorded video picture is inserted into the picture. In FIG. 13h, a sub-picture which comprises, on the one hand, the information concerning the playing time and, on the other hand, the indication that the recording function is active, is inserted into the video picture. This insertion can be diverted to the view finder in the case of a DVD camcorder, by way of example, with the result that the insertion is used for the information of the operator during recording. FIG. 13i shows an example of the realization of a special graphical insertion. In this case, the sub-picture unit comprises a mask signifying the view through binoculars.

For the example shown where the playing time which is accurate to the second is inserted, a new sub-picture unit must be generated and stored for each second. This application presumably relates to the most memory-intensive application, since the sub-picture unit must be changed very rapidly in this case (every second). Given an assumed recording rate of five Mbits per second and the assumption that each sub-picture unit occupies precisely one sector of the DVD, approximately 305 sectors for the remaining data of video, audio and the other sub-picture units lie between two recorded sectors for the playing time sub picture units. This means that the most memory-intensive sub-picture unit takes up at most 0.3% of the total capacity of the recording medium. However, the memory requirement can then additionally be reduced to less than 0.1% by appropriate compression, for example by a playing time sub-picture unit completely containing the display for 5 seconds, that is to say the playing time sub-picture unit contains the bit map date for 5 different displays and automatically changes over the content of the display from one second to the next.

The abovementioned programming option which enables the user to prescribe the order in which the additional information items that he desires are to be successively inserted can be realized in such a way that a table in a store of the sub-picture decoding unit has entered in it the sub-picture unit (that is to say Sub__stream__id) which is to be selected at which instant, which sub-picture unit is then processed.

However, the invention can also be employed in DVD video recorders and/or DVD music recorders. In the case of the music recorders, title details, etc., can then be output as information via a screen.

The invention can predominantly be used for application in DVD recording and reproduction apparatuses. The DVD RAM apparatuses as well as DVD recording apparatuses and DVD camcorders as well as DVD video recorders currently in development are mentioned in particular in this case. The application possibilities are not restricted just to these, however. Even if sub-picture units are used in other generations of recording apparatuses, nothing impedes the possibility of application.

What is claimed is:

1. Method for controlling a recording device for selectively recording video or audio signals and an additional information item, the information item adapted for subsequent insertion into a video picture during reproduction, comprising the steps of:
   generating in the recording device the information item, the information item comprising machine generated status information indicative of a recording operation status, including one of date, time, playing time, and operation mode;
   converting the data for the information item into a sub-picture unit; and
   recording the sub-picture unit in at least one sub-picture data pack in addition to the data packs for the video signal or audio signal according to the format of the DVD standard on a storage medium.

2. Method according to claim 1, wherein the converting step comprises constructing the sub-picture unit to include a compressed bit map representing the information item, and a table with control commands that, in the reproduction mode, the recorded sub-picture unit is converted by decoding the compressed bit map and processing the control commands in such a way that the information item is inserted into the video picture.

3. Method according to claim 2, wherein run length coding is used to compress the bit map.

4. Method according to claim 1, wherein the generating step comprises generating data for further additional information item input by an operator.

5. Method according to claim 1, wherein the information item and the further additional information item are in the form of text characters or graphics characters.

6. Method according to claim 5, further comprising the step of providing a table with run length-coded text/graphics characters, from which table the text/graphics characters necessary for the information item and the further additional information item are selected and are combined to form the corresponding bit map thereby simplifying the generation of the run lenght-coded bit map.

7. Method according to claim 6, wherein the following specifications are made for the run length decoding in the table for each line of a text/graphics character:
   a) number of data words, in particular nibbles or bits, for describing the run length code of this pixel line,
   b) number of background pixels until the first character pixel in the pixel line,
   c) number of background pixels after the last character pixel in the pixel line,
   d) run length code of the pixel line without leading and trailing background pixels.

8. Method according to claim 1, further comprising the steps of recording simultaneous a plurality of information items; and
   selectively inserting one of the plurality of information items into the video picture.

9. Method according to claim 8, wherein one or a plurality of the following additional information items and further additional information items are recorded:
   date
   time of day
   date+time of day
   playing time
   operating mode
   title
   user-defined special text insertion
   user-defined special graphics insertion.

10. Method according to claim 1, further comprising the step of programming the order in which a number of information items or further additional information items are to be successively inserted for a recording section.

11. Recording apparatus for recording video or audio signals and signals representing an information item which is capable of subsequent insertion into a video picture during reproduction, comprising:
    means for generating data for the information item, the information item comprising machine generated status information related to a recording operation, including one of date, time, playing time, and operation mode;
    an encoding unit for generating from the data for the information item data packs for a sub-picture unit; and
    recording means for recording data packs for the video or audio signals, as well as, the sub-picture unit according to the DVD standard on a storage medium.

12. The recording apparatus according to claim 11, further comprising a real time clock associated with the machine generation of status information.

13. Recording medium, comprising:
    video or audio data signals stored on the recording medium according to the DVD standard; and
    additional information item stored on the recording medium, the additional information item adapted for subsequent insertion into a video picture during reproduction of the video picture, the additional information item comprising machine generated status information related to a recording operation, including one of date, time, playing time, and recording mode, the additional information item being recorded on the recording medium in the format of a sub-picture unit in a sub-picture data pack in addition to the data packs of the video or audio data signals.

14. Method for controlling a recording device for recording an additional information item with video and/or audio data in the format of the DVD standard, which information item may be subsequently inserted into a video picture during reproduction, comprising the steps of:

generating in the recording device information items related to machine generated time information associated with the recording operation;

regularly sampling the information items and converting the sampled information items into the format of a sub-picture unit; and recording the converted sampled information item in at least one sub-picture data pack along with the data packs for the video signal and/or audio signal on the storage medium.

15. Apparatus for recording and reproducing audio/video signals and time information related to the recording operation recorded with the video/audio signal, which information may be subsequently inserted into a video picture during reproduction, comprising:

means for sampling a real time clock in regular intervals and for generating from the samples time information for storage in one or more data packs for a sub-picture unit;

means for recording the data packs associated with the clock time information along with data packs associated with the audio/video signal on a storage medium;

an encoding unit, coupled to the sample means, for constructing the sub-picture units to include a compressed bit map for inserting the time information, and a table with display control commands for inserting the time information; and a decoding unit for decoding the recorded sub-picture unit, which decoding unit converts the sub-picture unit contained in the data pack during reproduction for insertion of the time information into the video picture.

* * * * *